R. KRONENBERG.
SECURING DEVICE FOR REMOVABLE WHEELS.
APPLICATION FILED DEC. 16, 1912.
1,180,660.
Patented Apr. 25, 1916.
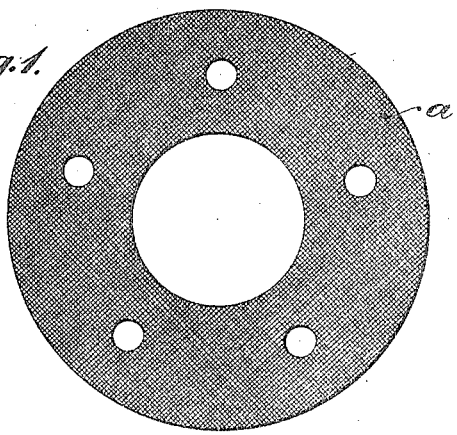
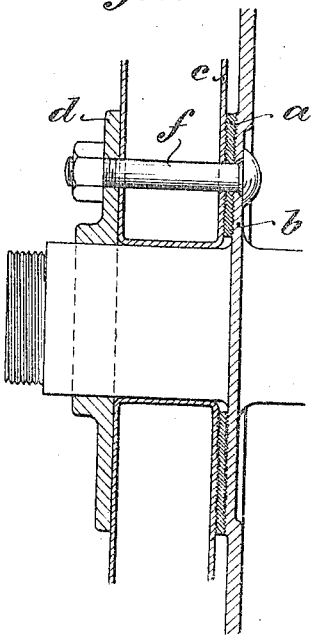
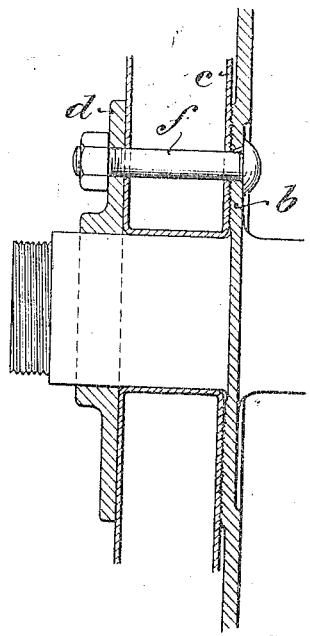
Witnesses:
Inventor
R. Kronenberg
per F. Dittmer
Attorney.

UNITED STATES PATENT OFFICE.

RUDOLF KRONENBERG, OF OHLIGS, GERMANY.

SECURING DEVICE FOR REMOVABLE WHEELS.

1,180,660.  Specification of Letters Patent.  Patented Apr. 25, 1916.

Application filed December 16, 1912.  Serial No. 736,970.

*To all whom it may concern:*

Be it known that I, RUDOLF KRONENBERG, subject of the King of Prussia, (German Emperor,) residing at Ohligs, in the Province of the Rhine, Kingdom of Prussia, German Empire, have invented certain new and useful Improvements in Securing Devices for Removable Wheels, of which the following is a specification.

This invention relates to a securing device for removable wheels. With wheels which are removable from the hub, it is essential to provide a special securing device in order to relieve the screws which serve for holding fast the wheel upon the hub.

Hitherto, there have been provided attached to the fixed hub flange, one or more fastening pins, which engaged in corresponding cavities of the wheel body, or there were formed projections and depressions upon the hub, which projections and depressions corresponded to the wheel boring. These connecting devices are complicated and troublesome when the wheels are interchanged and also partly weaken the wheel body.

The present invention is designed to obviate these drawbacks. For this purpose there is inserted between the removable wheel body and the hub flange, a hardened steel disk, which is roughened either on both sides or only on one side, the contact surface of the wheel body and the hub flange are themselves provided with roughening. When the wheel body is pressed against the hub flange by the fastening screws, then the points formed by the roughening penetrate into the contact surfaces of the wheel body or of the hub flange. Consequently there can take place no relative movement between the wheel body and the hub, and the wheel body is rotated by the hub and in this manner the relieving of the fastening screws is effected. If there is a disk roughened on both sides, this can be loosely interposed; but if the disk is only roughened on one side, then it must be fixed with its smooth side to that one of the two adjacent surfaces which is smooth, that is to say, either to the hub flange or to the wheel body.

In the accompanying drawing—Figure 1 shows the elevation of a roughened disk *a*. Fig. 2 shows a section through the middle part of the wheel with a constructional modification of the attachment disk *a* which disk is roughened on both sides, Fig. 3 illustrates a section through a middle part of the wheel with roughened side flange.

*b* indicates the fixed flange of the hub, *e* the middle part of the removable wheel body and *d* the removable flange.

*f* indicates the screws which serve to fix the detachable flange *d* and thereby to secure the wheel body to the fixed flange *b*. These screws are therefore relieved of strain by means of the roughened disk *a*. In this construction there is no special disk necessary, because the hub flange itself engages with the projections of its roughening in the depressions of the wheel body. If the wheel body on the other hand, be roughened, then its roughened surface engages the depressions in the hub flange. The roughened parts are preferably also hardened.

Having now described the invention, what I claim is,—

In a removable wheel, an outer hub body having alining apertures therein, an inner hub body, a fixed flange carried at the inner end of the inner hub body and having apertures formed therein, a roughened disk interposed between said fixed flange and the opposed face of said outer hub body and provided with a series of apertures, a removable flange on the outer end of said inner hub body and having apertures adapted to aline with corresponding apertures of said outer hub body, said roughened disk, and said fixed flange, and a transverse bolt engaged in said alining apertures, whereby to releasably bind the several parts together.

In testimony, whereof I have signed my name to, this specification in the presence of two subscribing witnesses.

RUDOLF KRONENBERG.

Witnesses:
 LOUIS VANDORY,
 H. J. DUNLAP.